United States Patent Office 2,920,107
Patented Jan. 5, 1960

2,920,107

PHOSPHINE BORINE COMPOUNDS AND THEIR PREPARATION

Anton B. Burg, Los Angeles, and Ross I. Wagner, Montebello, Calif., assignors, by mesne assignments, to American Potash & Chemical Corporation, a corporation of Delaware No Drawing. Application June 17, 1957
Serial No. 666,214

14 Claims. (Cl. 260—543)

This invention, which is a continuation-in-part of our copending application, Serial No. 446,148, filed July 27, 1954, now abandoned relates in general to the preparation of phosphine borines which have halogen atoms bonded to the boron and thus are useful as intermediates in the manufacture of certain cyclic phosphino-borines by the dehydrohalogenation method as set forth in our copending applications Serial No. 666,204, Serial No. 666,205, Serial No. 666,206, and Serial No. 666,213, filed even date herewith.

Application Serial No. 446,147, filed July 27, 1954, now abandoned, also shows the manufacture of the cyclic phosphinoborines in similar fashion, as does the divisional application of the aforementioned Serial No. 446,147, which is identified as application Serial No. 754,914, filed August 14, 1958.

The phosphine borines to which this invention is directed are those of the general formula:

$$RR'HP:BYY'Y''$$

wherein R and R' are aliphatic or aromatic radicals and wherein Y, Y' and Y'' are hydrogen, aliphatic radicals, aromatic radicals or certain halogens, at least one of the "Y" symbols representing one of these halogens, i.e., chlorine, bromine or iodine.

In the preferred embodiment of this invention, R and R' are either alkyl radicals having less than 13 carbons, lower alkenyl, lower cycloalkyl, cyclohexenyl, phenyl, lower alkyl-substituted phenyl or biphenyl, and Y, Y' and Y'' are either H, Cl, Br, I, alkyl radicals having less than 9 carbon atoms, lower cycloalkyl or phenyl, and, as stated, at least one of the symbols Y, Y' and Y'' must be either Cl, Br or I.

It is not possible to prepare in high yields phosphinoborines which bear hydrocarbon radicals on the boron by the pyrolysis of corresponding phosphine borines. Pyrolysis of materials of this type results in the formation of various phosphine trialkylborines and phosphine triarylborines which cannot be converted into the phosphinoborines. At temperatures below those at which a hydrogen atom is lost from both the phosphorous and the boron of a phosphine borine to yield a phosphinoborine, disproportionation of the reactant occurs, yielding materials which no longer have a free hydrogen available on the boron atom. It is desirable to provide a method for the production of these phosphinoborines which have aliphatic, aromatic or halogen substituents bonded to the boron. These materials, the phosphinoborines of the type having other than merely hydrogens bonded to the boron, are chemically and thermally stable, having somewhat higher spontaneous ignition temperatures and higher melting points than the phosphinoborines having only hydrogens bonded to the boron. These properties, plus excellent dielectric properties, suit them for use as dielectrics where high temperatures and opportunities for chemical reaction, such as hydrolysis and oxidation, are encountered. Aliphatic and aromatic groups, when bonded to the boron atom, contribute properties (particularly high melting points) in the ultimate products which particularly fit them for use as high temperature dielectric materials. Analogous phosphinoborines having only hydrogens on the boron have considerably lower melting points and therefore can be used only in applications suited to liquids and low melting solids.

Also, it is difficult to prepare phosphinoborines having unsaturated hydrocarbon substituents on either the P or B atom from the corresponding phosphine borines by the pyrolysis route.

It is therefore an object of this invention to provide for the preparation of phosphine borine intermediate products which may thereafter be converted to phosphinoborines having aliphatic or aromatic substituents bonded to the phosphorous and those radicals or halogens bonded to the boron atom.

Another object of the invention is to provide for the preparation of phosphine borines which may be converted to phosphinoborines having unsaturated hydrocarbon substituents bonded to either the phosphorous or the boron atom.

Further objects and advantages of this invention, if not specifically set forth, will become apparent during the course of the discussion which follows.

As set out in our aforementioned copending applications, filed even date herewith, it has been found that phosphine borines having at least one hydrogen bonded to the phosphorous and at least one halogen atom excluding fluorine bonded to the boron may be dehydrohalogenated in the presence of a tertiary amine at low temperatures (preferably room temperature), thereby providing a method for the production of phosphinoborines which does not result in disproportionation of a phosphine borine having hydrocarbon substituents bonded to the boron atom and which does not destroy any unsaturated bonds which may be present.

It is necessary that a halogen from the group chlorine, bromine and iodine, and excluding fluorine, be bonded to the boron atom if the dehydrohalogenation method is to be used since essential to the dehydrohalogenation method is the removal of the hydrohalogen acid which forms by means of a tertiary amine. Where fluorine is bonded to the boron, the HF acid which forms behaves entirely unlike the other hydrohalogen acids, not being a strong acid in solution. Thus, it does not combine with the weak base to form an insoluble ternary ammonium salt. Therefore, the HF acid cannot be extracted from a P:B complex, thus making impossible the formation of the desired phosphinoborine. Stronger bases than the amines cannot be used since such materials as alkalis tend to displace the weaker phosphine base from the phosphine borine addition compound.

Broadly, to form the phosphine borine necessary for the practice of the aforementioned dehydrohalogenation method, a phosphine and a borine, or sources thereof, are placed in a reaction vessel in contact with each other. Under suitable temperature conditions, often as low as −110° C. and as high as room temperature, a reaction occurs between the phosphine and the borine with the phosphine borine being formed as the addition product. The reaction between the phosphine and the borine is carried out in the absence of moisture and in a non-oxidizing atmosphere. The reactor should first be flushed with nitrogen or similar inert gas, or be evacuated before the reactants are introduced.

Also, certain B-halo phosphine borines may be prepared from phosphine borines having at least a single hydrogen bonded to the boron by reaction with hydrohalogen acids.

Generally speaking, the reaction is exothermic and tends to occur vigorously. The vigor of the reaction may be at least partially controlled by the use of suitable external cooling means, such as liquid nitrogen or a dry ice bath, by the use of suitable diluents which serve to prevent the temperature of the reaction from becoming unduly high and which may act as the solvent medium for the reaction, or by using both external cooling and a diluent. Obviously, however, the reaction is preferably carried out at a temperature as closely approaching room temperature as is feasible—the violence of the reaction being the limiting factor. However, as in laboratory work,

*Example III.*—80.3 cc. each of dimethylphosphine and dimethylbromoborine were brought together in 10 ml. benzene, which, on evaporation, yielded the colorless solid dimethylphosphine dimethylbromoborine $$(CH_3)_2HP:BBr(CH_3)_2$$

The stoichiometry for and additional information regarding further runs wherein a phosphine may be reacted with diborane to produce a phosphine borine addition product are set forth in Table A below:

TABLE A

| Example No. | Phosphine | Grams | Boron Compound | Grams | Solvent | Principal Phosphine Borine Product |
|---|---|---|---|---|---|---|
| IV | $(C_6H_5)_2PH$ | 1.08 | $BCl_3$ | 1.17 | Benzene | $(C_6H_5)_2HP:BCl_3$. |
| V | $C_6H_5(CH_3)PH$ | 1.18 | $(C_2H_5)_2BBr$ | 1.49 | Diethyl ether | $C_6H_5(CH_3)HP:BBr(C_2H_5)_2$. |
| VI | $C_2H_5(n-C_5H_{11})PH$ | 1.188 | $B_2H_5Br$ | 0.481 | | $C_2H_5(n-C_5H_{11})HP:BBrH_2$. |
| VII | $3-CH_2=CHCH_2CH_2(CH_3)PH$ | 0.204 | $B_2H_5Br$ | 0.107 | Diethyl ether | $3-CH_2=CHCH_2CH_2(CH_3)HP:BH_2Br$. |
| VIII | $n-C_4H_9(n-C_8H_{17})PH$ | 2.224 | $B_2H_5Br$ | 0.642 | | $n-C_4H_9(n-C_8H_{17})HP:BH_2Br$. |
| IX | $C_6H_{11}(CH_3)PH$ | 1.170 | $(C_2H_5)_2BBr$ | 1.089 | Benzene | $C_6H_{11}(CH_3)HP:BBr(C_2H_5)_2$. |
| X | $(p-C_6H_5C_6H_4)_2PH$ | 1.731 | $(CH_3)_2BCl$ | 0.762 | do | $(p-C_6H_5C_6H_4)_2HP:B(CH_3)_2Cl$. |
| XI | $C_6H_5(CH_3)PH$ | 2.750 | $(CH_3)_2BBr$ | 2.178 | do | $C_6H_5(CH_3)HP:B(CH_3)_2Br$. |
| XII | $C_6H_5(CH_3)PH$ | 1.252 | $(n-C_8H_{17})_2BBr$ | 4.301 | do | $C_6H_5(CH_3)HP:BBr(n-C_8H_{17})_2$. |
| XIII | $C_6H_5(CH_3)PH$ | 1.012 | $(C_2H_5)_2BBr$ | 1.152 | do | $C_6H_5(CH_3)HP:BBr(C_2H_5)_2$. |
| XIV | $(CH_3C_6H_4)_2PH$ | 1.316 | $(n-C_3H_7)_2BBr$ | 1.246 | do | $(CH_3C_6H_4)_2HP:BBr(n-C_3H_7)_2$. |
| XV | $C_6H_5(CH_3)PH$ | 0.968 | $(C_6H_{11})_2BBr$ | 1.773 | do | $C_6H_5(CH_3)HP:B(C_6H_{11})_2Br$. |
| XVI | $C_6H_5(n-C_{12}H_{25})PH$ | 2.793 | $(CH_3)_2BBr$ | 1.221 | do | $C_6H_5(n-C_{12}H_{25})HP:B(CH_3)_2Br$. |
| XVII | $C_6H_9(CH_3)PH$ | 0.768 | $BBr_3$ | 1.524 | do | $C_6H_9(CH_3)HP:BBr_3$. |
| XVIII | $(C_6H_{11})_2PH$ | 1.584 | $(C_6H_5)_2BBr$ | 1.840 | Diethyl ether | $(C_6H_{11})_2HP:BBr(C_5H_9)_2$. |
| XIX | $(C_7H_{13})_2PH$ | 1.42 | $(C_6H_5)_2BBr$ | 1.40 | Benzene | $(C_7H_{13})_2HP:BBr(C_6H_5)_2$. |
| XX | $(C_2H_5)_2PH$ | 0.546 | $(C_6H_5)_2BBr$ | 1.404 | do | $(C_2H_5)_2HP:BBr(C_6H_5)_2$. |
| XXI | $(n-C_4H_9)_2PH$ | 0.402 | $(C_6H_5)_2BBr$ | 1.052 | do | $(n-C_4H_9)_2HP:BBr(C_6H_5)_2$. |
| XXII | $C_8H_{17}(CH_3)PH$ | 0.804 | $(C_6H_5)_2BBr$ | 0.936 | do | $C_8H_{17}(CH_3)HP:BBr(C_6H_5)_2$. |
| XXIII | $(C_5H_9)_2PH$ | 0.479 | $(CH_3)_2BI$ | 0.562 | Cyclohexane | $(C_5H_9)_2HP:BI(CH_3)_2$. |
| XXIV | $n-C_3H_7(C_2H_5)PH$ | 0.520 | $C_2H_5BCl_2$ | 0.555 | Diethyl ether | $n-C_3H_7(C_2H_5)HP:BCl_2C_2H_5$. |
| XXV | $(CH_3)_2PH$ | 0.089 | $BHCl_2$ | 0.117 | do | $(CH_3)_2HP:BCl_2H$. | where relatively fragile equipment is employed, low temperatures are preferred.

The reactor should be formed of a material which will resist the corrosive effects of the reaction and have sufficient strength to withstand the temperatures and pressures The stoichiometry for and additional information regarding further runs wherein a phosphine borine is treated with a hydrohalogen acid, as described in Example II above, to yield the desired phosphine borine are set forth in Table B below:

TABLE B

| Example No. | Phosphine Borine | Grams | HX | Grams | Approx. Reac. Temp., °C. | Product |
|---|---|---|---|---|---|---|
| XXVI | $n-C_{12}H_{25}(CH_3)HP:BH_3$ | 1.15 | HCl | 0.183 | −78 | $n-C_{12}H_{25}(CH_3)HP:BH_2Cl$. |
| XXVII | $n-C_7H_{15}(CH_3)HP:BH_3$ | 0.160 | HCl | 0.036 | −78 | $n-C_7H_{15}(CH_3)HP:BH_2Cl$. | that may occur during the reaction; where the process is carried out on a small scale, a heat-resistant glass flask is suitable for use as a reactor.

Various examples showing the practice of the invention are set forth below by way of illustration.

*Example I.*—Dimethylbromoborine in the amount of 1.089 g. was placed in a 200 ml. reaction flask which had been flushed with nitrogen. The flask was fitted with a distillation head and an addition funnel in which a nitrogen atmosphere was also maintained. Diethyl ether in the amount of 50 ml. was added to the flask followed by 1.062 g. phenylmethylphosphine, this latter material being added slowly as solution in 50 ml. diethyl ether. The solvent was thereafter removed by distillation at reduced pressure to yield a quantity of phenylmethylphosphine dimethylbromoborine $$C_6H_5(CH_3)HP:BBr(CH_3)_2$$

*Example II.*—Diborane in an amount of 0.143 g. was distilled into a 20 ml. tube which had been externally cooled to −196° C. and previously flushed with nitrogen. 10 ml. diethyl ether and 0.0305 g. dimethylphosphine was distilled into the tube. The tube was warmed to −78° C. to initiate the reaction which was of an exothermic nature. The phosphine borine addition compound was then treated with 0.0182 g. HCl and dimethylphosphine chloroborine obtained, $(CH_3)_2HP:BH_2Cl$.

As can be seen from the foregoing, it is possible to make a wide variety of phosphine borines, it being essential that a single hydrogen be available on the phosphorous and a single halogen atom, excepting a fluorine atom, available on the boron. All materials falling within this category are of value as precursors in the manufacture of cyclic phosphinoborines which may themselves be used for various purposes or be further treated as set forth in our copending applications.

Obviously many modifications and variations of the invention as hereinbefore set forth may be made without departing from the spirit and scope thereof, and therefore only such limitations should be imposed as are indicated in the appended claims.

We claim:

1. A phosphine borine having the formula $$RR'HP:BYY'Y''$$

wherein R and R' are selected from the class consisting of alkyl radicals having less than 13 carbon atoms, lower alkenyl, lower cycloalkyl, cyclohexenyl, phenyl, lower alkyl-substituted phenyl and biphenyl and wherein Y, Y' and Y'' are selected from the class consisting of H, Cl, Br, I, alkyl radicals having less than 9 carbon atoms, lower cycloalkyl and phenyl, at least one of said symbols Y, Y' and Y'' representing a member selected from the class consisting of Cl, Br and I.

2. The phosphine borine of claim 1 wherein at least one of said symbols R and R' represents an alkyl radical having less than 13 carbon atoms.

3. The phosphine borine of claim 1 wherein at least one of said symbols R and R' represents a lower alkyl-substituted phenyl group.

4. The phosphine borine of claim 1 wherein at least one of said symbols Y, Y' and Y" represents a lower alkyl group.

5. A phosphine borine having the formula $$R(C_6H_5)HP:BYY'Y''$$

wherein R is selected from the class consisting of alkyl radicals having less than 13 carbon atoms, lower alkenyl, lower cycloalkyl, cyclohexenyl, phenyl, lower alkyl-substituted phenyl and biphenyl and wherein Y, Y' and Y" are selected from the class consisting of H, Cl, Br, I, alkyl radicals having less than 9 carbon atoms, lower cycloalkyl and phenyl, at least one of said symbols Y, Y' and Y" representing a member selected from the class consisting of Cl, Br and I.

6. A phosphine borine having the formula $$RR'HP:B(H)YY'$$

wherein R and R' are selected from the class consisting of alkyl radicals having less than 13 carbon atoms, lower alkenyl, lower cycloalkyl, cyclohexenyl, phenyl, lower alkyl-substituted phenyl and biphenyl and wherein Y and Y' are selected from the class consisting of H, Cl, Br, I, alkyl radicals having less than 9 carbon atoms, lower cycloalkyl and phenyl, at least one of said symbols Y and Y' representing a member selected from the class consisting of Cl, Br and I.

7. A phosphine borine having the formula $$RR'HP:B(Br)YY'$$

wherein R and R' are selected from the class consisting of alkyl radicals having less than 13 carbon atoms, lower alkenyl, lower cycloalkyl, cyclohexenyl, phenyl, lower alkyl-substituted phenyl and biphenyl and wherein Y and Y' are selected from the class consisting of H, Cl, Br, I, alkyl radicals having less than 9 carbon atoms, lower cycloalkyl and phenyl.

8. A phosphine borine having the formula $$RR'HP:B(Cl)YY'$$

wherein R and R' are selected from the class consisting of alkyl radicals having less than 13 carbon atoms, lower alkenyl, lower cycloalkyl, cyclohexenyl, phenyl, lower alkyl-substituted phenyl and biphenyl and wherein Y and Y' are selected from the class consisting of H, Cl, Br, I, alkyl radicals having less than 9 carbon atoms, lower cycloalkyl and phenyl.

9. Dimethylphosphine dimethylbromoborine.
10. Methylphenylphosphine dimethylbromoborine.
11. Diethylphosphine diphenylbromoborine.
12. Diphenylphosphine dimethylbromoborine.
13. Cyclohexylmethylphosphine diethylbromoborine.
14. Dimethylphosphine chloroborine.

References Cited in the file of this patent

Burg et al.: "Amer. Chem. Soc. Jour.," vol. 75, pp. 3872–3877, (1953).

Hewitt et al.: "Chemical Society Journal" (London), pp. 530–534 (1953), pub. Feb. 1953, received in Patent Office Library Apr. 1, 1953.